: US 8,199,543 B2
: Jun. 12, 2012

(12) United States Patent
Huang et al.

(54) POWER CONVERTER WITH EXTREMELY LOW STANDBY POWER CONSUMPTION

(75) Inventors: Ming-Ho Huang, Taipei Hsien (TW); Yang Wang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 135 days.

(21) Appl. No.: 12/502,801

(22) Filed: Jul. 14, 2009

(65) Prior Publication Data

US 2011/0013434 A1    Jan. 20, 2011

(51) Int. Cl.
*H02M 7/00* (2006.01)
(52) U.S. Cl. ........................................... 363/125
(58) Field of Classification Search .............. 363/52, 363/54, 85, 125
See application file for complete search history.

(56) References Cited

U.S. PATENT DOCUMENTS

| | | | | |
|---|---|---|---|---|
| 4,677,366 A | * | 6/1987 | Wilkinson et al. | 363/89 |
| 5,341,284 A | * | 8/1994 | Huang | 363/89 |
| 6,055,167 A | * | 4/2000 | Shamkovich et al. | 363/52 |
| 6,608,770 B2 | * | 8/2003 | Vinciarelli et al. | 363/61 |
| 2007/0296380 A1 | * | 12/2007 | Lanni | 323/222 |

* cited by examiner

*Primary Examiner* — Jue Zhang
(74) *Attorney, Agent, or Firm* — Chun-Ming Shih; HDLS IPR Services

(57) ABSTRACT

The present invention relates to a power converter with extremely low standby power consumption. The power converter comprises a rectification module having at least one unilateral switch which has a control terminal, an anode terminal and a cathode terminal. The control terminal is coupled to a control signal, wherein when the control signal issues a first level, the channel between the anode terminal and the cathode terminal is enabled to act as a unilateral switch; and when the control signal issues a second level, the channel between the anode terminal and the cathode terminal is open circuited.

10 Claims, 2 Drawing Sheets

POWER CONVERTER WITH EXTREMELY LOW STANDBY POWER CONSUMPTION

BACKGROUND OF THE INVENTION

1. Field of the Invention

The present invention relates to an AC to DC power converter, especially to a power converter with extremely low power consumption, which consumes extremely low power under light loading or empty loading and complies with the green or power saving requirements.

2. Description of the Related Art

To reduce the power consumption of an AC to DC power converter under light loading or empty loading, most conventional designs would put an additional switch such as relay or MOSFET at the AC power input terminal to provide a mechanism for switching off the AC power. However, there are disadvantages in putting the additional switch at the AC power input terminal. First, it increases the cost. Second, it reduces the power conversion efficiency. Third, it interferes with heat dissipation. These disadvantages will degrade the performance of the power converter and cause the vendors to bear higher operation expenses. Therefore, there is a need to provide a mechanism, which will not increase the cost or reduce the power conversion efficiency or interfere with heat dissipation, to implement a power converter with extremely low standby power consumption.

In view of the disadvantages of the conventional standby mechanism for the AC to DC power converter, the present invention proposes a solution to shut off the AC power without the need of any additional switch. The rectification module of the power converter according to the present invention is designed to possess a normal rectification mode and an AC power shut-off mode. The rectification module can be enabled to operate in the normal rectification mode when the power converter is under normal loading, or disabled to operate in the AC power shut-off mode to drive the power converter into a standby state with low power consumption when the power converter is under light loading or empty loading.

SUMMARY OF THE INVENTION

One objective of the present invention is to provide a mechanism for a power converter with extremely low standby power consumption to shut off AC power and drive the power converter into a standby state with low power consumption without the need of any additional switch.

Another objective of the present invention is to provide a power converter with extremely low standby power consumption of which a rectification module can be enabled to operate in the normal rectification mode when the power converter is under normal loading, or disabled to operate in the AC power shut-off mode to drive the power converter into a standby state with low power consumption when the power converter is under light loading or empty loading.

To accomplish the objectives mentioned above, the present invention proposes a power converter with extremely low standby power consumption, of which the rectification module can be enabled to operate in the normal rectification mode to convert an AC power to a DC power, or be disabled to operate in the AC power shut-off mode to drive the power converter into the standby state with low power consumption, wherein the rectification module includes at least one controllable unilateral switch, used to enable or disable the rectification of the rectification module according to a control signal.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

Figure 1:
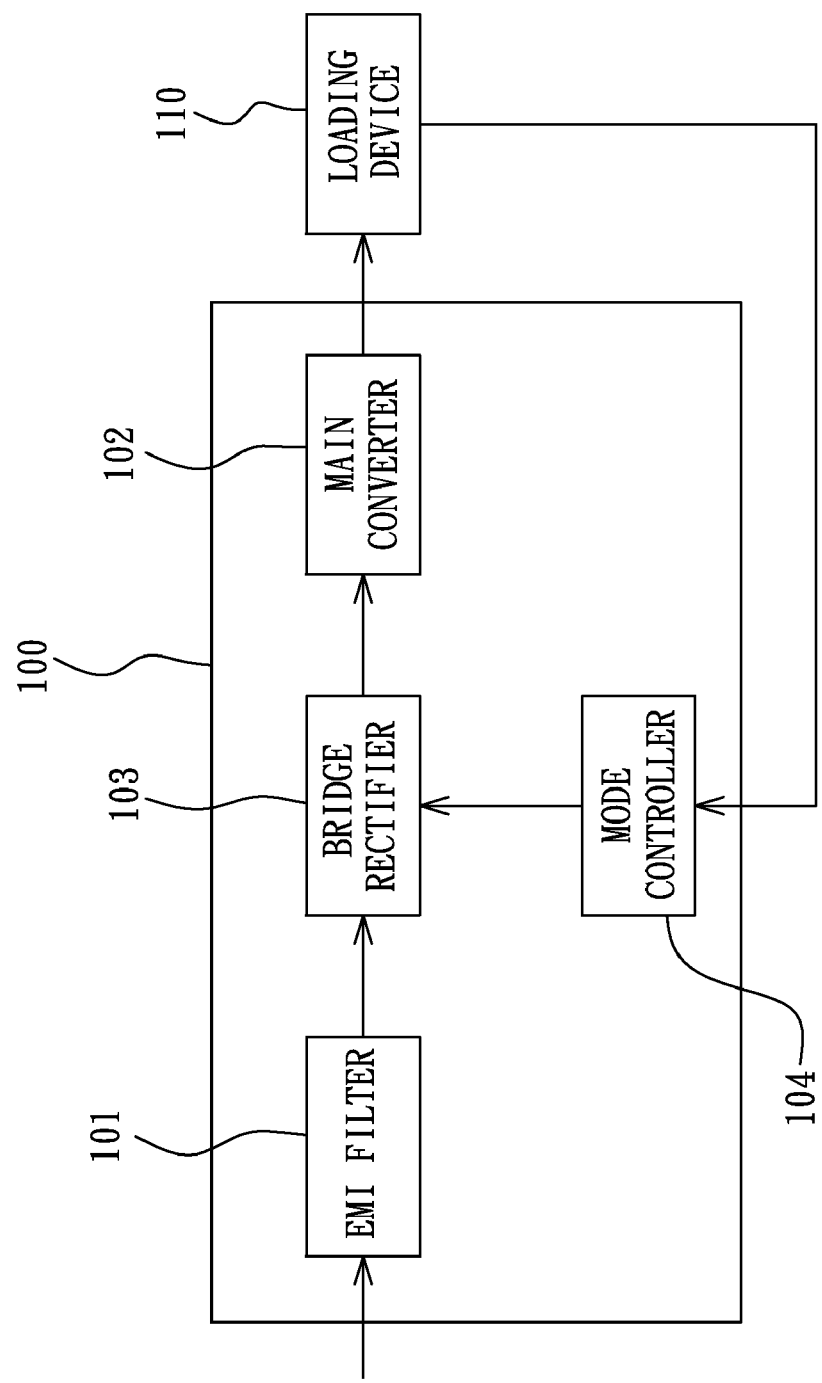
FIG. 1 shows the block diagram of a power converter with extremely low standby power consumption according to a preferred embodiment of the present invention.
Figure 2:
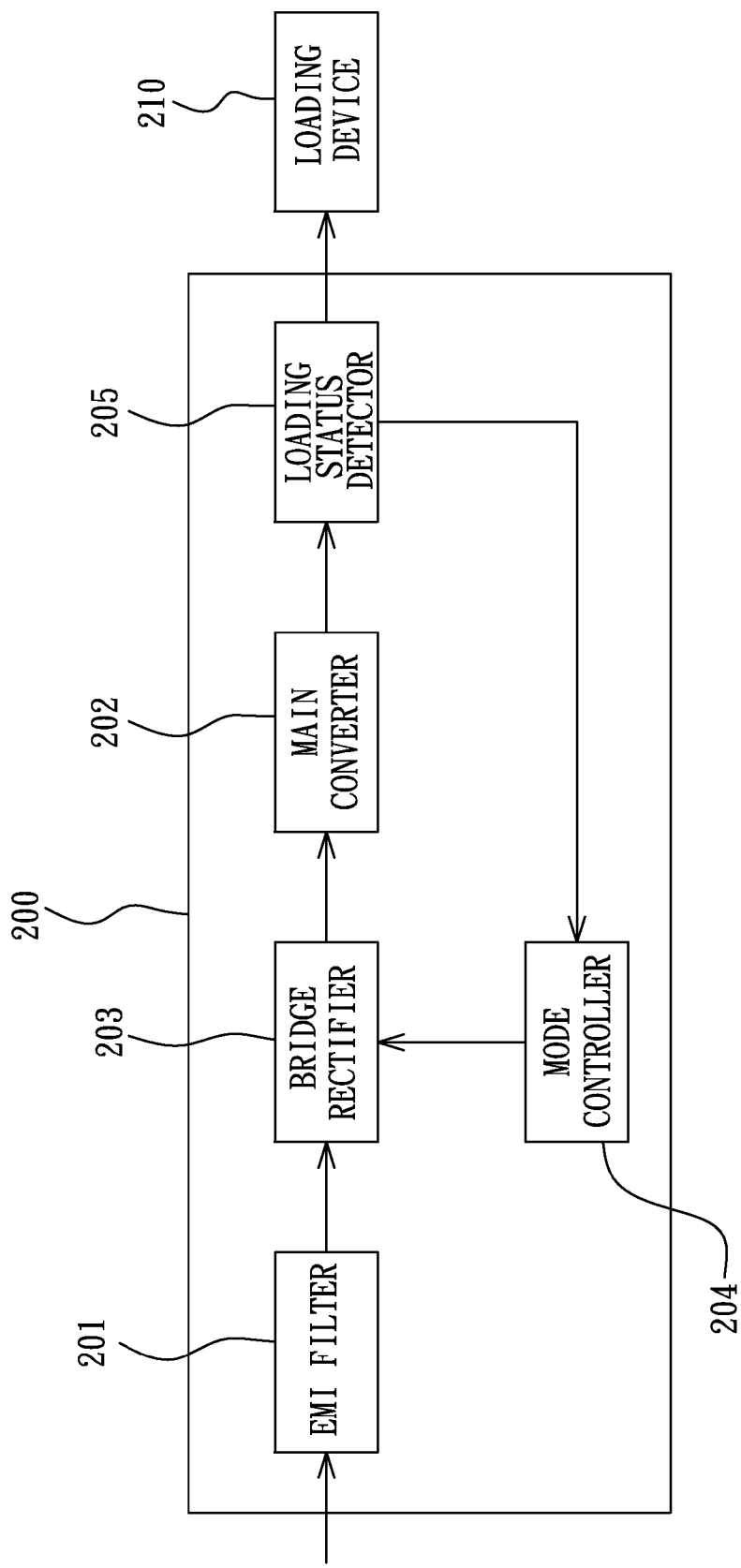
FIG. 2 shows the block diagram of a power converter with extremely low standby power consumption according to another preferred embodiment of the present invention.

Please refer to FIG. 1, which shows the block diagram of a power converter with extremely low standby power consumption according to a preferred embodiment of the present invention. As shown in the figure, the power converter 100 with extremely low standby power consumption according to a preferred embodiment of the present invention is used to convert an external AC power to a DC power for a loading device 110. The power converter 100 comprises an EMI filter 101, a main converter 102, a bridge rectifier 103 and a mode controller 104.

In the architecture, the EMI filter 101 has an AC input end and an AC output end, with the AC input end being coupled to the external AC power and the AC output end being coupled to the bridge rectifier 103 to filter out the EMI (Electro-Magnetic Interference) at the AC power input terminal of the power converter.

The main converter 102 has a main power input end and a DC output end, with the main power input end being coupled to a rectification output of the bridge rectifier 103 and the DC output end being coupled to a loading device 110, wherein the main converter 102 is used to convert the rectification output of the bridge rectifier 103 to the DC power, and the main converter 102 preferably includes a power factor correction function.

The bridge rectifier 103 has a rectification input end, a control end and a rectification output end, with the rectification input end being coupled to the AC output end of the EMI filter 101 to rectify the external AC power, the control end being coupled to the mode controller 104 and the rectification output end being coupled to the main power input end of the main converter 102, wherein the bridge rectifier 103 is preferably a full-wave rectifier, which has a positive half cycle rectification path corresponding to positive half cycles of the AC power and a negative half cycle rectification path corresponding to negative half cycles of the AC power. The positive half cycle rectification path and the negative half cycle rectification path each comprises a controllable unilateral switch or diode—a three-terminal device which can be enabled or disabled. The three-terminal device has an enable/disable control terminal, an anode terminal and a cathode terminal, wherein the enable/disable control terminal is coupled to the control end of the bridge rectifier 103 to receive a control signal from the mode controller 104. When the control signal is at a first level, the channel between the anode terminal and the cathode terminal is enabled to act as a unilateral switch or diode. When the control signal is at a second level, the channel between the anode terminal and the cathode terminal is open circuited. As a result, the three-terminal devices can turn on or shut off the rectification cycles to make the bridge rectifier 103 possess two operation modes: a normal rectification mode and an AC power shut-off mode. If the control signal is at the first level, the three-terminal devices are enabled and the bridge rectifier 103 will operate in the normal rectification mode to facilitate the power converter 100 to convert the external AC power to the DC power normally. If the control signal is at the second level, the three-terminal devices are disabled and the bridge rectifier 103 will operate in the AC power shut-off mode to make the power converter 100 enter a standby state, and due to the fact that the AC power is shut off, the power consumption of the power converter 100 is nearly zero.

The mode controller 104 has a status input end and a control output end, with the status input end being coupled to the loading device 110, and the control output end being coupled to the control end of the bridge rectifier 103. The mode controller 104 is used to generate the control signal at the control output end according to a status signal from the loading device 110 to control the three-terminal devices of the bridge rectifier 103. The status signal has a first state, representing normal loading, and a second state, representing light loading or empty loading. When the status signal is in the first state, the control signal will be set to the first level to enable the three-terminal devices to make the bridge rectifier 103 operate in the normal rectification mode, and the power converter 100 will convert the external AC power to the DC power normally. When the status signal is in the second state, the control signal will be set to the second level to disable the three-terminal devices and make the bridge rectifier 103 operate in the AC power shut-off mode, and the power converter 100 will enter the standby state.

If the loading device does not support the status signal, then a loading status detector is implemented in the power converter of the present invention. As shown in the figure, the power converter 200 of the present invention with extremely low standby power consumption is used to convert an external AC power to a DC power for a loading device 210. The power converter 200 comprises an EMI filter 201, a main converter 202, a bridge rectifier 203, a mode controller 204 and a loading status detector 205.

In the architecture, the EMI filter 201 is placed between the external AC power and the bridge rectifier 203 to filter out the possible EMI.

The main converter 202 is coupled to a rectification output of the bridge rectifier 203 and used to convert the rectification output of the bridge rectifier 203 to the DC power. The main converter 202 preferably comprises a power factor correction function.

The bridge rectifier 203 is coupled to the external AC power through the EMI filter 201, and used to rectify the external AC power. The bridge rectifier 203 is preferably a full-wave rectifier, which has a positive half cycle rectification path corresponding to positive half cycles of the AC power and a negative half cycle rectification path corresponding to negative half cycles of the AC power. The positive half cycle rectification path and the negative half cycle rectification path each comprises a controllable unilateral switch or diode—a three-terminal device which can be enabled or disabled. The three-terminal device has a control terminal, an anode terminal and a cathode terminal, wherein the control terminal is coupled to a control signal from the mode controller 204. When the control signal is at a first level, the channel between the anode terminal and the cathode terminal is enabled to act as a unilateral switch or diode. When the control signal is at a second level, the channel between the anode terminal and the cathode terminal is open circuited. As a result, the three-terminal devices can turn on or shut off the rectification cycles to make the bridge rectifier 203 possess two operation modes: a normal rectification mode and an AC power shut-off mode. If the control signal is at the first level, the three-terminal devices are enabled and the bridge rectifier 203 will operate in the normal rectification mode to facilitate the power converter 200 to convert the external AC power to the DC power normally. If the control signal is at the second level, the three-terminal devices are disabled and the bridge rectifier 203 will operate in the AC power shut-off mode to make the power converter 200 enter a standby state, and due to the fact that the AC power is shut off, the power consumption of the power converter 200 is nearly zero.

The mode controller 204 is used to generate the control signal according to a status signal from the loading status detector 205 to control the three-terminal devices of the bridge rectifier 203. The status signal has a first state, representing normal loading, and a second state, representing light loading or empty loading. When the status signal is in the first state, the control signal will be set to the first level to enable the three-terminal devices to make the bridge rectifier 203 operate in the normal rectification mode, and the power converter 200 will convert the external AC power to the DC power normally. When the status signal is in the second state, the control signal will be set to the second level to disable the three-terminal devices and make the bridge rectifier 203 operate in the AC power shut-off mode, and the power converter 200 will enter the standby state.

The loading status detector 205 has a loading current input end, a status output end and a loading current output end, with the loading current input end being coupled to the main converter 202; the status output end being coupled to the mode controller 204; and the loading current output end being coupled to the loading device 210. The loading status detector 205 is used to detect the power or current delivered from the power converter 200 to the loading device 210, and thereby issue the status signal. The loading status detector 205 preferably comprises a sensing resistor for transforming current to voltage.

Through the implementation of the present invention in which the bridge rectifier can be enabled or disabled, a power converter capable of entering a standby state is proposed. In the present invention, the three-terminal devices, which can be enabled or disabled, can be used not only to realize the rectification function but also to shut off AC power, so there is no need of any additional switch. As a result, the cost will not be increased; the conversion efficiency will not be effected; and the present invention does conquer the disadvantages of the prior art power converters when realizing a standby state.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A power converter with extremely low standby power consumption, comprising:
    an EMI filter, having a first input end and a first output end, wherein said first input end is coupled to an AC power;

a bridge rectifier, having a second input end, a control end and a second output end, wherein said second input end is coupled to said first output end, and said bridge rectifier comprises at least one unilateral switch which can be enabled or disabled;

a mode controller, having a third input end and a third output end, wherein said third output end is coupled to said control end of said bridge rectifier;

a main converter, having a fourth input end and a fourth output end, wherein said fourth input end is coupled to said second output end and said fourth output end is used to provide a DC power; and a loading status detector having a fifth input end, a status output end and a fifth output end, wherein said fifth input end is coupled to said fourth output end, said status output end is coupled to said third input end, and said fifth output end is coupled to a loading device, and wherein said mode controller is used to generate a control signal at the third output end according to a status signal outputted from said loading status detector to control said unilateral switch of said bridge rectifier, and said loading status detector is used to detect power or current delivered from said power converter to the loading device and thereby issues the status signal.

2. The power converter with extremely low standby power consumption as claim 1, wherein said main converter has a power factor correction function.

3. The power converter with extremely low standby power consumption as claim 1, wherein said bridge rectifier is used to perform full-wave or half-wave rectification.

4. The power converter with extremely low standby power consumption as claim 1, wherein said control signal is in a first level to enable said unilateral switch to make said bridge rectifier operate in a normal rectification mode when said loading status detector detects a normal loading to generate said status signal which is in a first state.

5. The power converter with extremely low standby power consumption as claim 1, wherein said control signal is in a second level to disable said unilateral switch to make said bridge rectifier operate in an AC power shut-off mode to drive the power converter into a standby state when said loading status detector detects a light loading or an empty loading to generate said status signal which is in a second state.

6. The power converter with extremely low standby power consumption as claim 1, wherein said unilateral switch is controlled both in a positive half cycle and a negative half cycle.

7. A method of operating a power converter with extremely low standby power consumption comprising following steps:

(a) providing an EMI filter, having a first input end and a first output end, wherein said first input end is coupled to an AC power;

(b) providing a bridge rectifier, having a second input end, a control end and a second output end, wherein said second input end is coupled to said first output end, said bridge rectifier comprises at least one unilateral switch which can be enabled or disabled;

(c) providing a mode controller, having a third input end and a third output end, wherein said third output end is coupled to said control end of said bridge rectifier;

(d) providing a main converter with a power factor correction function, having a fourth input end and a fourth output end, wherein said fourth input end is coupled to said second output end and said fourth output end is used to provide a DC power; and (e) providing a loading status detector having a fifth input end, a status output end and a fifth output end, wherein said fifth input end is coupled to said fourth output end, said status output end is coupled to said third input end, and said fifth output end is coupled to a loading device, and wherein said mode controller is used to generate a control signal at the third output end according to a status signal outputted from said loading status detector to control said unilateral switch of said bridge rectifier, and said loading status detector is used to detect power or current delivered from said power converter to the loading device and thereby issues the status signal.

8. The method of operating said power converter with extremely low standby power consumption as claim 7, wherein said control signal is in a first level to enable said unilateral switch to make said bridge rectifier operate in a normal rectification mode when said loading status detector detects a normal loading to generate said status signal which is in a first state.

9. The method of operating said power converter with extremely low standby power consumption as claim 7, wherein said control signal is in a second level to disable said unilateral switch to make said bridge rectifier operate in an AC power shut-off mode to drive the power converter into a standby state when said loading status detector detects a light loading or an empty loading to generate said status signal which is in a second state.

10. The method of operating said power converter with extremely low standby power consumption as claim 7, wherein said unilateral switch is controlled both in a positive half cycle and a negative half cycle.

\* \* \* \* \*